United States Patent [19]

Crawford

[11] Patent Number: 4,609,268

[45] Date of Patent: Sep. 2, 1986

[54] VISUAL PRESENTATION PROJECTION APPARATUS

[76] Inventor: Cliff Crawford, 8 Piedmont Dr., Cranbury, N.J. 08512

[21] Appl. No.: 596,540

[22] Filed: Apr. 4, 1984

Related U.S. Application Data

[63] Continuation of Ser. No. 145,131, Apr. 30, 1980, abandoned.

[51] Int. Cl.$^4$ ............................................. G03B 21/00
[52] U.S. Cl. ......................................... 353/25; 353/97
[58] Field of Search ...................... 353/25, 27 R, 27 A, 353/75, 76, 88, 95–97, 46, 47, 50, 51, 22, 23; 352/82, 83, 87, 121, 52, 232

[56] References Cited

U.S. PATENT DOCUMENTS

| | | | |
|---|---|---|---|
| 1,177,797 | 4/1916 | Oppenheimer | 352/82 |
| 3,342,103 | 9/1967 | Fabaey | 353/15 |
| 3,415,600 | 12/1968 | Yarbrough | 352/87 |
| 3,450,472 | 6/1969 | Warden | 353/11 |
| 3,549,250 | 12/1970 | Pantenburg | 353/97 |
| 3,551,042 | 12/1970 | Brink et al. | 353/75 X |
| 3,751,152 | 8/1973 | Rinehart | 353/27 X |
| 3,885,867 | 5/1975 | Nelson et al. | 353/95 X |
| 3,923,390 | 12/1975 | Susko | 353/95 |
| 4,190,899 | 2/1980 | Smith et al. | 353/27 A X |

FOREIGN PATENT DOCUMENTS

| | | | |
|---|---|---|---|
| 699594 | 12/1930 | France | 353/27 R |
| 947561 | 1/1949 | France | 353/46 |
| 1281559 | 12/1961 | France | 353/97 |

*Primary Examiner*—Harry N. Haroian
*Attorney, Agent, or Firm*—Sachs & Sachs

[57] ABSTRACT

A visual presentation projection apparatus for creating dramatic visual presentations from a single transparency which simultates motion and therefore gives the viewer the feeling of moving within a scene includes illumination means for directing a beam of light through a transparency, optical means for projecting the image disposed on the transparency, and means for moving the transparency within the path of light projected by the illumination means during projection, the movement of the transparency permitting continuous selection and projection of various portions of the transparency on a viewing surface, the portion to be projected being randomly selectable.

38 Claims, 8 Drawing Figures

VISUAL PRESENTATION PROJECTION APPARATUS

CROSS REFERENCE TO RELATED APPLICATION

This is a continuation of the Ser. No. 145,131 filed Apr. 30, 1980, now abandoned.

BACKGROUND AND/OR ENVIRONMENT OF THE INVENTION

1. Field of the Invention

The present invention relates to optical projection devices, and more particularly, to a visual presentation projection apparatus which produces a dramatic visual presentation wherein the image projected is continuously selectable during projection so that a moving integrated image can be projected providing for the viewer a visual experience akin to the feeling and sensation of motion experienced when viewing a moving scene.

2. Description of the Contemporary and/or Prior Art

Applications for visual presentations range from entertainment to marketing and to education. With the revolution in electronic technology, viewers have become more and more sophisticated in their expectations as to what constitutes an engrossing presentation. Projections of transparencies standing alone have given way to mutli-projector slide shows wherein several projectors are synchronized and present multiple simultaneous and/or alternating images on a viewing surface. This has demonstrably increased appeal to viewers. However, use of multiple slide projectors and synchronizing equipment is beyond the technological capabilities of most, and is, for the most part, beyond the economic capabilities of many. One of the interesting effects that can be accomplished by synchronized projectors is the impartation to the viewer of a sense of movement through the use of a series of images which show various single shots of the subject as it undergoes motion. For instance, a sequence of transparencies of someone running, when shown in a series, can impart a feeling of motion, or a series of transparencies taken of a landscape, each taken at a different panning angle relative to the preceding transparency can give the feeling of the viewer turning to survey the landscape. Creation of such presentations is costly, complicated, and very time consuming.

Variations in the projection of a single transparency in the art are abundant, but basically all of these apparatuses present means and techniques for sequencing the projection of single stable images rather than providing for the projection of a stationary or moving image of an integrated transparency as taught by the present invention. Typical of apparatuses which provide for projection of single images is U.S. Pat. No. 3,317,151 issued to J. S. Wright on May 2, 1967 which provides for projection of a filmstrip. Similarly, U.S. Pat. No. 2,110,484 issued to R. S. Hopkins on Mar. 8, 1938 shows a projector for projecting a strip of film having a plurality of discrete images thereon for viewing when the strip is stopped in position. Of course, numerous devices exist for showing single photographic transparencies or slides, but because such apparatuses, commonly known as slide projectors, are in such widespread amateur and professional use, it is not deemed necessary to cite specific apparatuses here. However, each has the same operational constraint of permitting a single slide or transparency to be projected at a time. That transparency can be positioned for projection either manually or automatically as desired by the user.

A variation of typical slide projectors is provided by U.S. Pat. No. 3,923,390 invented by J. A. Susko on Dec. 2, 1975. Susko teaches an industrial optical slide projector wherein the transparency can be rotated within its projection plate for extremely accurate alignment. However, this apparatus is used to precisely position the image which is projected, not as an enhancement to the visual presentation provided and any movement is incidental to image alignment. Similarly, U.S. Pat. Nos. 3,881,814 issued to F. J. Madison II on May 6, 1975; and 2,552,211 issued to F. J. Perillo on May 8, 1951 permit rotational orientation, respectively, of a slide and a slide and/or filmstrip so that proper vertical or horizontal positioning can be accomplished depending upon the subject matter or format of the image being projected. As in Susko, these apparatuses are designed for adjusting the positioning of what ultimately will be a single stationary image so that this single stationary image can be viewed most favorably.

Other apparatuses provide for the projection of one of many single stationary discrete images. U.S. Pat. No. 3,807,850 issued to J. Ozeki on Apr. 30, 1974 teaches an overhead projector wherein rotatable reflectors are provided which can be vertically and horizontally rotated to compensate for an angularly displaced slide so that proper projection of a single slide selected from a rack of many slides can be accomplished.

U.S. Pat. No. 3,412,480 issued to C. A. Connell on Nov. 26, 1968 and U.S. Pat. No. 3,973,344 issued to H. Frankel on Aug. 10, 1976 both teach educational apparatuses wherein a multi-image transparency which is divided into discrete sections can be projected one section at a time onto a viewing surface. The resulting projected images are stationary and are essentially the same as that which would be provided by traditional projection of a single transparency by a slide projector.

U.S. Pat. No. 3,715,157 issued to H. R. Worthington, Jr. shows a projection apparatus wherein a plurality of lenses are used to project selected sections of a transparency. In an alternate embodiment, a shutter system is used in a single lens so that selected sections of a transparency can be projected. No movement of the transparency during projection is shown or suggested.

U.S. Pat. No. 2,130,562 issued to V. E. Pratt on Sept. 20, 1938 teaches an apparatus for projecting a filmstrip having a plurality of discrete images disposed thereon. Through movement of the lens system, the exact discrete portion of the filmstrip which is to be projected can be addressed. The resulting image is a single motionless projection.

All of these transparency projection apparatuses suffer from the common problem of being unable to provide a feeling of movement or the ability to show movement in the subject that is projected, and therefore techniques such as ganging projectors and using synchronization means as previously mentioned, must be resorted to to create an engrossing and creative presentation. An alternative, if a feeling of motion is to be imparted to the viewer, is the use of motion picture film where a plurality of discrete images are passed at several frames a second through an optical projection device. The result is that the viewer's mind merges these discrete images together so that movement is simulated. However, the expense of creating motion picture films compared to that of creating transparencies is several orders of magnitude, and therefore, it is not practical for many applications. In addition, the mechanics of the equipment and the optics thereof which must be employed are much more precise than those needed for the projection of a transparency and an additional expense is incurred if comparable quality is to be accomplished. Certainly, quality of the projected image is of the essence in all but the most casual presentations designed primarily for home use.

In the art far afield from projection of conventional photographic transparencies having integrated aesthetic images disposed thereon, a plurality of apparatuses have been developed for projecting selected portions of microfiche onto a viewing surface. Microfiche comprises a single piece of photographic material having a plurality of discrete images disposed thereon. Usually, these discrete images are pages of books, magazines, or the like which are individually addressed for viewing. A sheet of microfiche is moved in vertical and horizontal directions through suitable illumination and optical means so that a single discrete segment of the microfiche can be addressed and projected. This may be accomplished through manual or mechanical means, but each one of these devices ultimately is intended to project a single discrete image from a portion of the microfiche which is stationary at the time of projection and viewing. Such apparatuses abound in the art in various configurations and are shown in U.S. Pat. Nos. 3,224,326, 3,413,061, 3,563,645, 3,799,662, 3,841,747, 3,907,416, 4,033,684, 4,029,406, 4,072,860, and 4,077,708 among many others. Examination of these patents will show that various techniques and methods have been devised for moving microfiche in vertical and horizontal directions in a single plane so that a single discrete image can be sought out and projected. A positioning apparatus for this type of application can also be found in U.S. Pat. No. 3,881,369 issued to J. H. Looney on May 6, 1975. All of these microfiche apparatuses seek out and project a single stationary image, usually of reading material, for viewing.

The present invention overcomes the shortcomings found in the prior art and fulfills a long sought after need by providing a visual presentation projection apparatus which presents to the viewer a projected image that can impart a sense of motion of subject as well as of viewer without the use of a plurality of projectors and without the cost of motion picture techniques. Basically, this is accomplished through the projection of a high quality transparency having a continuous integrated image wherein selected sections of the transparency are projected at a time and the transparency is moved during projection to provide motion of the image on the viewing surface.

SUMMARY OF THE INVENTION

Therefore, a primary object of the present invention is to provide a visual presentation projection apparatus which can impart a sense of motion of the subject which is being viewed and a feeling of motion to the viewer of the image projected thereby.

A further object of the present invention is to provide a visual presentation projection apparatus which employs a continuous integrated image transparency for accomplishing its effect.

A still further object of the present invention is to provide a visual presentation projection apparatus wherein motion of a continuous integrated image transparency is accomplished during projection of that transparency so that selected portions thereof can be projected as desired by the user.

Still another object of the present invention is to provide a visual presentation projection apparatus which permits random access during projection of a continuous integrated image transparency for projection of selected portions thereof.

Still another further object of the present invention is to provide a visual presentation projection apparatus wherein the sections of the image to be projected can be preselected and sequenced through automatic controls or can be manually selected.

Another further object of the present invention is to provide a visual presentation projection apparatus which incorporates a variable focal length optical system for selecting the magnification of the portion of the image which will be projected.

Still another further object of the present invention is to provide a visual presentation projection apparatus which permits variable masking of the image to be projected wherein the masking corresponds with the area of the transparency which is to be projected by a variable focal length optical system.

Another still further object of the present invention is to provide a visual presentation projection apparatus wherein the transparency to be projected can be rotated to produce dramatic effects.

Still another further object of the present invention is to provide a visual presentation projection apparatus which can be employed to produce a very sophisticated visual presentation at a relatively low cost.

A still additional object of the present invention is to provide a visual presentation projection apparatus wherein the features thereof can be readily incorporated with existing technology relating to transparency projectors.

Still another additional object of the present invention is to provide a visual presentation projection apparatus which can be constructed of a variety of materials well known in the art.

Another still additional object of the present invention is to provide a method for creating a dynamic dramatic visual presentation from the projection of a single continuous integrated image transparency.

Still another further additional object of the present invention is to provide a visual presentation projection apparatus which is simple in design, relatively inexpensive to manufacture, rugged in construction, easy to use, and efficient in operation.

These objects, as well as further objects and advantages, of the present invention will become readily apparent after reading the ensuing description of the non-limiting illustrative embodiments and viewing the accompanying drawing.

A visual presentation projection apparatus for projecting a portion of a continuous integrated image transparency randomly selectable during projection includes illumination means for directing a beam of light along a selected path, means for mounting the transparency so a portion thereof is disposed in the preselected path, optical means disposed along the preselected path and positioned so the transparency is disposed between the illumination means and the optical means, the optical means for projecting the portion of the image of said transparency disposed in the path on a viewing surface, and means for moving the mounting means and therefore the transparency within the preselected path during projection for continuously selecting and projecting various selected portions of the transparency on the viewing surface, the moving means being capable of moving the transparency randomly.

BRIEF DESCRIPTION OF THE DRAWING

In order that the present invention may be more fully understood, it will now be described, by way of example, with reference to the accompanying drawings in which.

DESCRIPTION OF THE PREFERRED EMBODIMENTS

Figure 1:
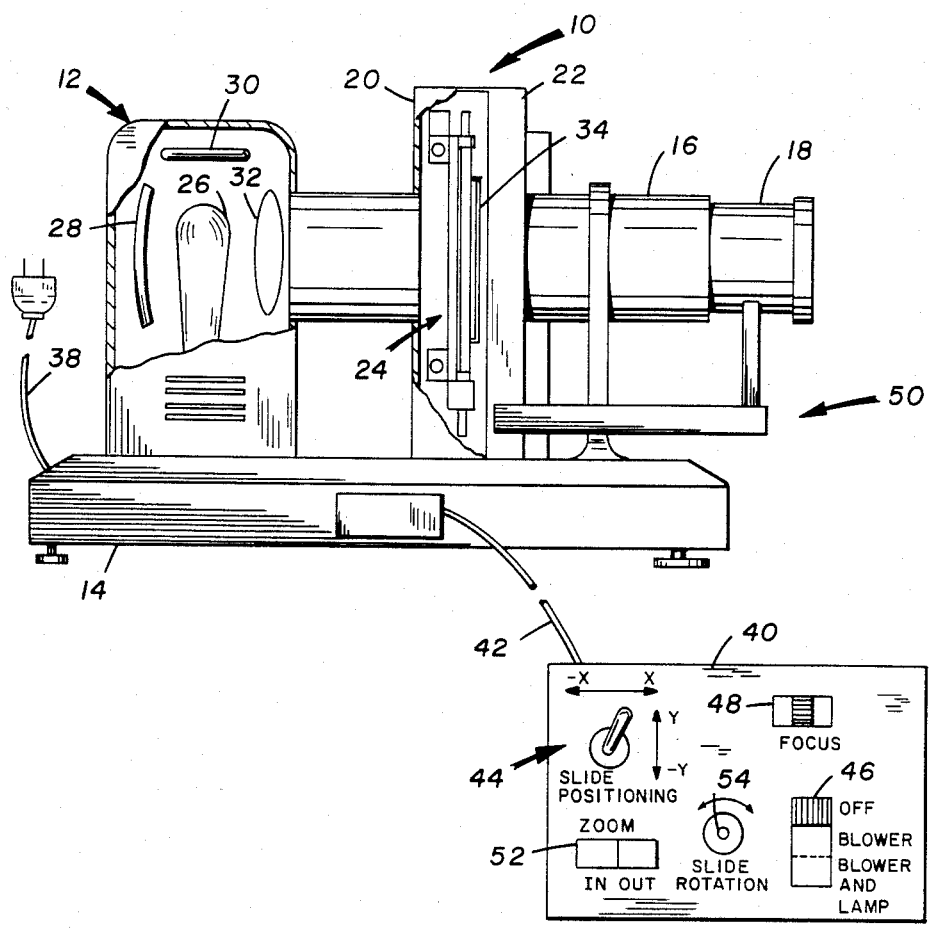
FIG. 1 is a partially broken away pictorial side elevation of an apparatus incorporating the features of the present invention therein.
Figure 6:
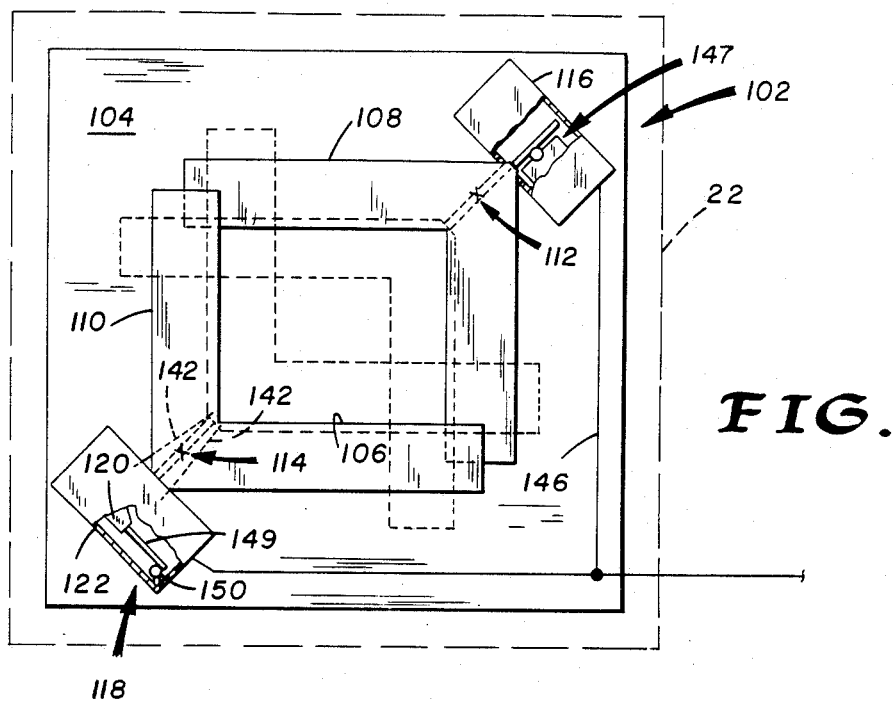
FIG. 6 is a pictorial representation of the masking feature of the present invention.
Figure 7:
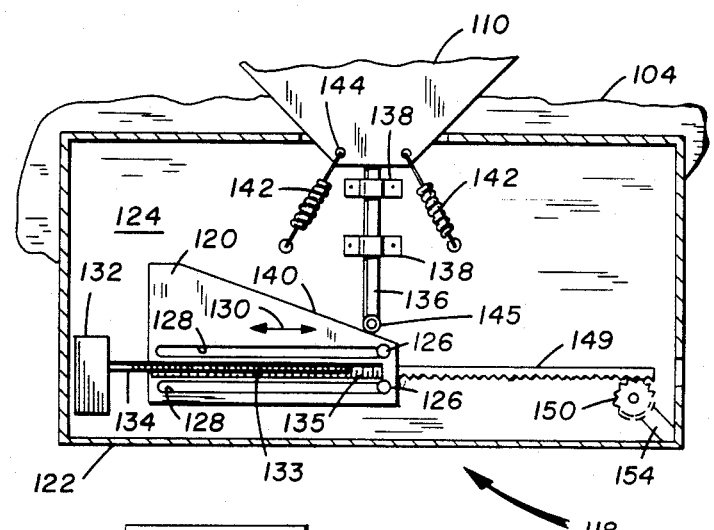
FIG. 7 is an enlarged pictorial representation of a portion of FIG. 6.

Referring now to the figures, and more particularly to FIG. 1 thereof, there is illustrated therein a visual presentation projection apparatus 10 incorporating therein the features of the present invention. The apparatus 10 includes a lamp housing 12 mounted on a base 14. A lens mount 16 is supported above the base 14 and provides an essentially hollow tube which mounts a lens 18 and opens into the lamp housing 12. In between the lens 18 and the lamp housing 12, a transparency compartment 20 and a mask compartment 22 are provided by suitable structure as illustrated. The contents of the transparency compartment 20 are illustrated in detail in FIG. 3 and will be fully described in conjunction therewith. The apparatus within the transparency compartment 20 basically comprises a transparency positioning apparatus 24. The assembly within the mask compartment 22 is illustrated in FIGS. 6 and 7 and will be fully discussed in conjunction therewith.

The lamp housing 12 is of a conventional design and may be variously configured as is well known in the art. Operably disposed within the lamp housing 12 is a projection lamp 26, a reflector 28, and a heat shield 30. The projection lamp 26, the reflector 28, and the heat shield 30 are arbitrarily illustrated and known equivalents can be substituted therefore. Basically, the job of the projection lamp 26 within the lamp housing 12 is to provide a beam of light directed through the lens mount 16. To this end, the beam of light is condensed by a condenser assembly 32 in a manner which is well known in the art. The condenser assembly 32 may comprise a single condenser or a plurality of condensers as desired. The projection lamp 26 may be of the tungsten or quartz variety or the equivalent. In addition, a blower, not illustrated, is provided to cool the interior of the lamp housing 12.

The beam of light directed through the lens mount 16 passes through the lens 18 mounted thereon which thereby projects a portion of the image disposed on the transparency 34 which is positioned by the transparency positioning carriage or apparatus 24.

Figure 2:
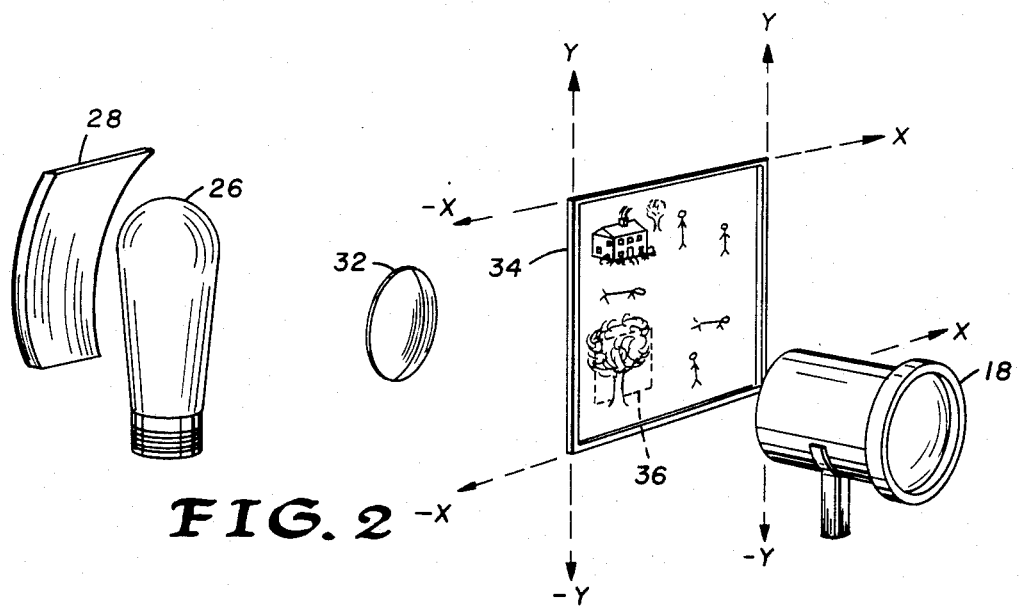
FIG. 2 is a schematic representation in perspective of an operational characteristic of the present invention.

This relationship is schematically shown in FIG. 2 which illustrates the transparency 34 disposed between the projection lamp 26 and the lens 18. As a result of this configuration, and the positioning of the transparency 34, a portion 36 of the transparency 34 is projected by the lens 18 onto a viewing surface, not illustrated. The transparency 34 comprises a continuous integrated image thereon which, for purposes of illustration, is shown as having a house, a tree, and several animals and people. By movement of the transparency 34 in the X or −X directions as shown by the phantom lines so labeled and in the Y or −Y directions as shown by the phantom lines also so labeled, different portions of the transparency 34 can be projected as desired. For instance, instead of projection of the tree disposed in portion 36, if the transparency 34 is shifted in the −Y direction, the image of the house of transparency 34 can be displayed. The transparency 34 is moved as desired by the user so that the different portions thereof as well as the transitions between portions can be projected by activation of the transparency positioning apparatus 24, as hereinafter described. The transparency 34 can be moved in the X, −X, or Y, −Y directions individually of simultaneously during projection. Although these represent substantially perpendicular directions, it should be apparent that movement in infinite directions is possible through control of proportional movement in the X, −X, and Y, −Y directions simultaneously.

The apparatus 10 is supplied operating power through a line cord 38 operably connected to the electrical components of the apparatus 10. The functions of the apparatus 10 are controlled by a control box 40. The various controls mounted in control box 40 are electrically connected to corresponding components of the apparatus 10 through an electrical cable 42.

Although the control box 40 is illustrated as being separated from the apparatus 10 to form a remote control, it may be incorporated therein or some of the components may be incorporated therein with the balance of the controls being disposed in the control box 40. Positioning of the transparency (slide) 34 is accomplished by a slide positioning control 44 of the "joystick" type. Through control circuitry, well known in the art, the slide positioning control 44 is coupled to a pair of drive motors which act on the transparency positioning apparatus 24 to move the transparency 34. Therefore, by manipulation of the control 44, the transparency 34 can be moved in the X, −X, or Y, −Y directions either simultaneously or separately as desired by the user. Preferably, through use of microprocessor controls well known in the art, the path of the transparency and therefore the different portions thereof which will be projected, can be preselected and controlled. For instance, pulses of different magnitudes can be sent to the drive motors which act upon the transparency positioning apparatus 24 in proportion to the distance in any direction that the transparency is to be moved. As a result, an entire show structured around a single transparency 36 can be controlled without intervention by a human operator. The projector is turned on and off by a conventional off-blower-lamp slide switch 46 which turns on the projection lamp 26 and a cooling blower, not illustrated, which is directed at the projection lamp 26 to keep it cooled to the proper operating temperature.

Figure 8:
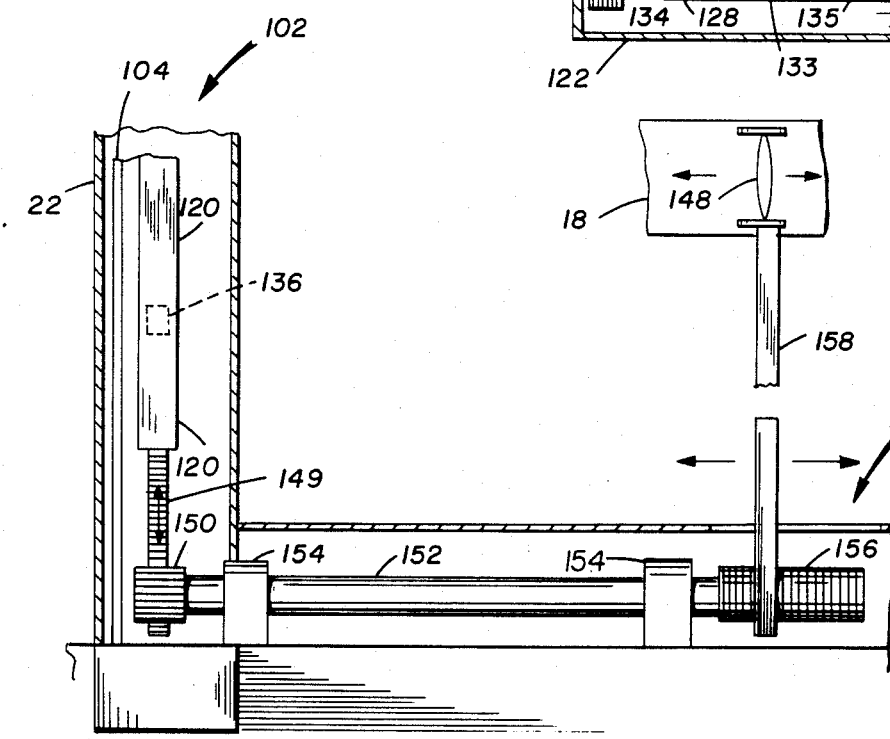
FIG. 8 is a fragmentary partially broken away pictorial representation of a portion of the variable mask means and variable focal length lens of the present invention illustrating the coupling of these two apparatuses together.

A remote focus control activated by a center-normal slide switch 48 is provided and is coupled to the lens 18 so that the lens 18 can be moved in and out of the lens mount 16 to focus the image which is to be projected. Such a focusing apparatus is well known in the art and therefore has not been illustrated. The lens 18 is of the zoom type and is zoomed, i.e., the focal length thereof is varied by a housed control arm assembly 50 which will hereinafter be discussed in detail in conjunction with FIG. 8. The zoom function of the present invention is controlled by a rocker type switch 52 operably connected to a suitable drive as illustrated in FIGS. 6, 7, and 8 as will hereinafter be discussed.

Transparency 34 of the present invention can be rotated during projection. This rotation will be fully discussed in conjunction with the structure that accomplishes this function illustrated in FIGS. 4 and 5. The control of the slide rotation function is accomplished by a bat handle switch 54 or the like.

It should be apparent to one of ordinary skill in the art that the various controls provided to control the functions of the present invention can be modified and that other features and controls found in projection apparatuses can be integrated therein without departing from the scope and spirit of the present invention. Additionally, several or all of these functions can be controlled by a suitable microprocessor which will coordinate the operation of various functions so that they can be sequenced or accomplished simultaneously as necessary or desired. Microprocessor technology to achieve such control functions is well known in the art and can be readily adapted to such an application.

Figure 3:
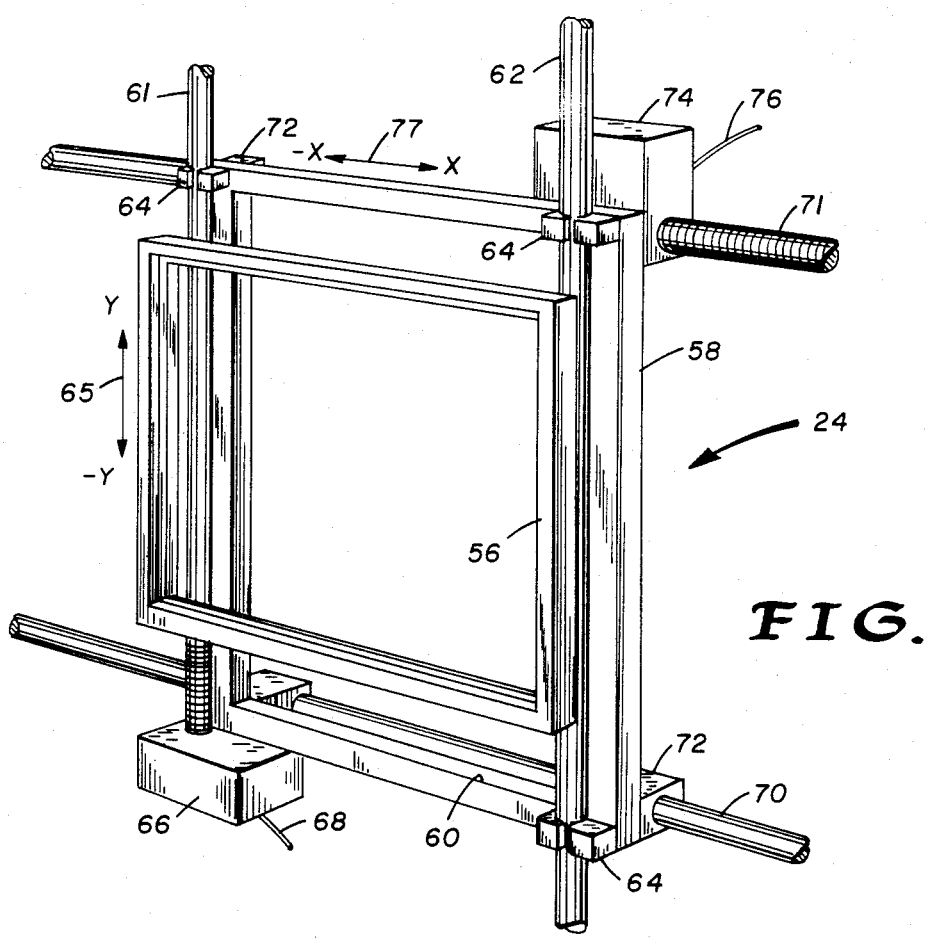
FIG. 3 is a pictorial representation of the transparency positioning carriage of the present invention.

Referring to FIG. 3, there is illustrated therein the transparency positioning apparatus or carriage 24 which is disposed within the transparency compartment 20 as illustrated in FIG. 1. The apparatus 24 comprises a frame 56 for mounting a transparency. The frame 56 can include a slot for accepting directly therein a mounted or unmounted transparency or can be provided with other suitable structure for accepting a subassembly which holds a transparency as detailed below. The transparency positioning carriage 24 includes a substantially planar support 58 having a projection aperture 60 disposed therethrough. The frame 56 is fixedly secured to a first pair of rails 61 and 62 which are substantially parallel. The rails 61 and 62 are movably mounted to the support 58 by a plurality of guides 64. The guides 64 maintain the rails 61 and 62 substantially parallel to the surface of the support 58 and permit movement of the rails 61 and 62 and therefore the frame 56 in the Y and −Y directions as illustrated by an arrow 65 so labeled. The rails 61 and 62 are permitted to freely slide within the guides 64 and are driven into such movement by a motor drive 66 which is coupled through a cable 68 to the control circuitry, not illustrated, and the slide positioning control 44. When the motor drive 66, which is of the reversible type, is activated by the control 44, the rail 61 to which it is coupled is moved along the longitudinal axis thereof. The motor drive 66 can be coupled to the rail 62 in any suitable manner including the screw type drive illustrated, frictional coupling, and various other gear configurations. If desired, the drive motor 66 can be coupled to both the rails 61 and 62 simultaneously or can be coupled to just one of the rails through various mechanical expedients.

A second pair of rails 70 and 71 are fixedly secured to a supporting surface provided by the interior of the transparency compartment 20, not illustrated in FIG. 3, but shown in FIG. 1. The support 58 is mounted on the substantially parallel rails 70 and 71 by a plurality of guides 72. A reversible motor drive 74 is fixedly secured to the support 58 and engages the guide rails 71. The motor drive 74 engages the guide rail 71 in much the same manner as the motor drive 66 engages the guide rail 61. The motor drive 74 is coupled to the slide positioning control 44 and the associated control circuitry, not illustrated, by a cable 76. When the slide positioning control 44 is properly moved, the drive motor 74 causes proportional movement of the support 58 in the X, −X directions, as selected, as illustrated by an arrow 77 so labeled.

It should be apparent that upon manipulation of the joystick type slide positioning control 44, the frame 56 can be moved in the X, −X and Y, −Y directions within the plane in which it is disposed. As a result, a transparency mounted in a frame can be manipulated to project various selected portions thereof as shown schematically in and previously described in conjunction with FIG. 2. Various modifications to the transparency positioning carriage 24 can be made without departing from the scope of the present invention. For instance, alternate drive mechanisms can be employed as well as different types of guides and assemblies for mounting the frame to the support and the support to fixed guide rails. The motor drives are preferably of the variable speed type, and the speed at which they operate can be preselected or can be proportional to the speed that the slide positioning control 44 is moved. The frame 56 is illustrated as being substantially rectangular and therefore would mount a substantially rectangular transparency. Therefore, the projection aperture 60 is also illustrated as being rectangular. It should be apparent that these shapes can be varied depending upon the specific dimensions of the type of transparency which is to be projected. Although the carriage 24 has been shown and described as being motor driven, a manual version of the present invention can be constructed within the scope of the present invention wherein various types of hand operated mechanical drives, well known in the art, would be substituted for the motor drives 66 and 74.

Figure 4:
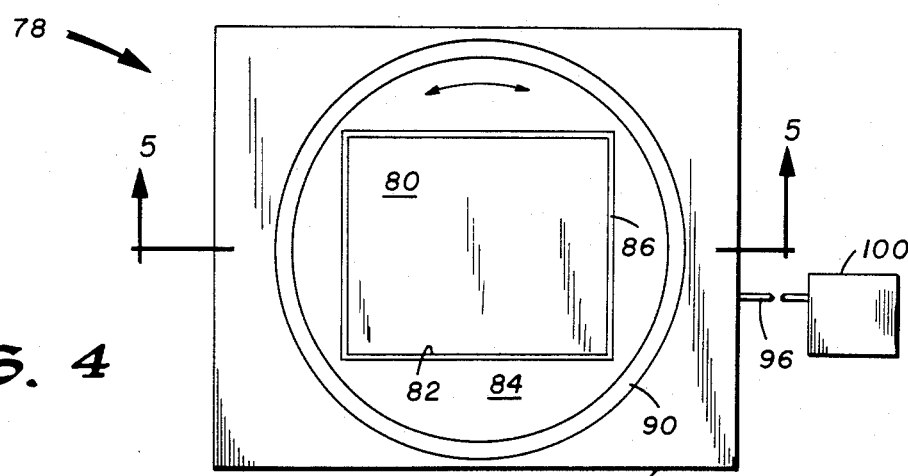
FIG. 4 is a front view of the transparency holder of the present invention.
Figure 5:
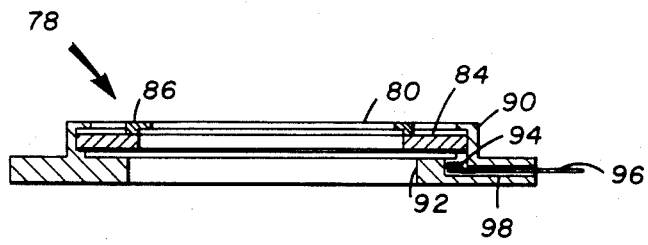
FIG. 5 is a cross section taken substantially along the lines 5—5 of FIG. 4.

Referring to FIGS. 4 and 5, there is illustrated therein a slide holder 78 for mounting therein a transparency 80. The slide holder 78 is dimensioned to be received within the opening of the frame 56, illustrated in FIG. 3. The holder 78 can be secured to the frame 56 in any suitable manner. A transparency 80 is held within an opening 82 disposed through a circular plate 84 in the slide holder 78 by a lip 86. The circular plate 84 is rotatably affixed to a rectangular plate 88 by a lip 90 which permits free rotation of the circular plate 84 therein. The rectangular plate 88 has a window 92 disposed therethrough over which the circular plate 84 is permitted to rotate. As a result, when the rectangular plate 88 of the slide holder 78 is mounted in the frame 56 rotation of the circular plate 84 permits free rotation of the transparency 80 mounted therein. Rotation of the circular plate 84 is accomplished through a drive gear or spur pinion 94 mounted on a drive shaft 96. The drive gear 94 engages teeth forming a face gear disposed in the circular plate 84 which are complementary to the teeth of the drive gear 94 so that rotation of the drive shaft 96, which is rotatably mounted in a chamber 98 formed by the rectangular plate 88, causes rotation of the circular plate 84.

The drive shaft 96 is rotated by a drive motor 100 which may be coupled to the drive shaft 96 in any customary manner. The motor drive 100 is reversible and the operation thereof is controlled by the switch 54 mounted on the control box 40 so that rotation of the transparency 80 can be accomplished as desired. The transparency 80 has merely been used for purposes of illustration and can well be the same as transparency 36 if the formating was adjusted. It should be apparent that the transparency positioning carriage or apparatus 24 can directly mount a transparency in the frame 56 thereof or the slide holder 78 can be mounted in the frame 56 if a rotational feature is desired. Control of the rotation of the transparency can be coupled to a microprocessor control as has been suggested with other control functions so that a rotational feature can be incorporated in a visual presentation effected through the use of the other features of the present invention. As various slide changing mechanisms exist in the art, these mechanisms can be incorporated in the apparatus 10 for operation in conjunction with the frame 56 or the plate 84 to change transparencies as desired by the user. Either automatic or manual slide changing mechanisms can be incorporated without departng from the scope of the present invention.

With reference to FIGS. 6 and 7, there is illustrated therein the structures which accomplish the masking and zoom functions of the present invention. A mask assembly 102 is illustrated in FIG. 6 and partially in FIG. 7 and includes a plate 104 having a substantially rectangular window 106 disposed therethrough. The plate 104 is fixedly secured within the mask compartment 22 by any suitable means as illustrated in FIG. 6. A pair of substantially L-shaped masking blades 108 and 110 are disposed adjacent to the plate 104 so as to form a rectangle with their inner edges as illustrated. Each of the masking blades 108 and 110 are slidably positioned adjacent to the plate 104 by suitable guides, not illustrated. Alternately, the blades 108 and 110 may be slidaby affixed to the plate 104 by diagonal slots disposed in the masking blades 108 and 110 which engage pins fixedly secured to the plate 104. Regardless of the manner in which the blades 108 and 110 are slidably affixed to the plate 104, they are permitted to travel in a path so that their imaginary vertexes 112 and 114 (each a point designated as an "X") can move toward and away from each other with the vertexes 112 and 114 being disposed in a single diagonal line dividing the rectangle formed by the blades 108 and 110 in half. As a result, when the vertexes are driven toward each other, the rectangle formed by the inner edges of blades 108 and 110 decreases in size with the sides thereof decreasing proportionately. When the vertexes 112 and 114 are moved away from each other, the size of the rectangle formed by the inner edges of the blades 108 and 110 increases. Although a specific mask configuration is illustrated and described, other masking configurations using different numbers and shapes of masking blades can be employed. When such is the case, the drives for the masks hereinafter described can be muliplied or suitably modified as necessary.

Masking blades 108 and 110 are moved toward and away from each other by a linear drive 116 and a linear cam drive assembly 118. An enlarged view of assembly 118 is illustrated in FIG. 7. The linear drive cam assembly 118 includes a linear cam 120 disposed within a housing 122. The housing 122 includes a mounting surface 124 to which the linear cam 120 is affixed by a pair of posts 126 which extend through a pair of elongated apertures 128 disposed in the cam 120. The posts 126 have enlarged head portions that retain the cam adjacent to the surface 124 and permit reciprocation thereof in the directions indicated by the arrow 130. The linear cam 120 is reciprocated by a drive 132 having a rotating shaft 134 including a worm gear portion 133 which engages a rack 135 fixedly secured to the cam 120.

The drive 132 is wired to the zoom switch 52 and depending upon the manner in which that switch is operated, i.e., in or out, the drive 132 causes the shaft 134 to rotate clockwise or counterclockwise. If the shaft 134 is rotated clockwise, the cam 120 is urged away from the drive 132 through the interaction of the worm gear portion 133 and the rack 135. When this happens, a cam follower rod 136, slidably mounted to the surface 124 by a pair of brackets 138, is forced away from the cam 20 by the beveled or sloped surface 140 thereof. A pair of springs 142 which are in tension, are each fixedly secured on one end thereof to the surface 24 and on the other end thereof to apertures 144 provided in the blade 110. As a result, the end 145 of the cam follower rod 136 is urged into close contact with the beveled or sloped surface 140. When the cam 120 is moved away from the drive 132, the cam follower rod 136 is forced away from the cam 120 further stretching the springs 142. The rod 136 is fixedly secured to the plate 110 adjacent to the vertex 114 thereof causing it to move as previously described. If the drive 132 is reversed and the cam 120 is pulled toward the same, the springs 142 pull the cam follower rod 136 toward the beveled or sloped surface 140, drawing the blade 110 away from the complementary blade 108. The drive 132 is electrically coupled by a cable 146 and is synchronized with a rack and pinion drive 147 provided by the linear drive 116 so that the blades 108 and 110 are moved in synchronization. The linear drive 116 and the linear cam drive assembly 118 can be replaced with other drive means such as rotating cams, rack and pinions, bell cranks, screws, or hydraulic linkages in various configurations as long as the blades 108 and 110 are moved simultaneously as described.

In addition to moving the blade 110, the linear cam drive assembly 118 also drives an optical segment 148 of the lens 18 to accomplish variation of the focal length thereof. This coupling relationship can best be realized by viewing FIGS. 7 and 8 together. An arm 149 is fixedly secured in a suitable manner to the end of the cam 120 so that it reciprocates therewith. The arm 149 incorporates a rack which engages a gear or pinion 150 fixedly mounted to a rotatable shaft 152. The shaft 152 is disposed within the control arm assembly 50 and is rotatably positioned by a pair of support journals 154. As the arm 149 reciprocates, as a result of movement of the cam 120, it engages the gear or pinion 150 and urges the shaft 152 into rotation. A screw gear 156 is fixedly secured to the shaft 152 and is urged into rotation when the shaft 152 rotates. A coupling bar 158 is fixedly secured on one end thereof to the optical segment 148 and the other end thereof has a threaded aperture which captures and threadably cooperates with the screw gear 156 to cause the bar 158 to walk back and forth in a path substantially perpendicular to the shaft 152 upon the rotation thereof. As a result, the optical segment 148 is moved thereby adjusting the focal length of the lens 18. Engagement between the coupling bar 158 and the screw gear 156 may employ many alternate gearing associations well known in the art or other expedients. For instance, the coupling bar 158 can have a rack fixedly secured thereto for cooperation with a complementary worm gear substituted for the gear 156. Upon rotation of the worm gear, the rack and therefore its coupling bar 158 would be moved substantially perpendicular to the shaft 152. Although not illustrated, a suitable guide to maintain the positioning of the coupling bar 158 must be provided. Lenses which have a movable optical segment to change the focal length thereof are well known in the art as are such apparatuses which work in a push pull mode. However, if the focal length of the lens 18 was to be changable by rotation of an element thereof, this could easily be accomplished with the incorporation of suitable structure having the correct gearing relationship to the shaft 152. Such expedients are well known within the skill of the ordinary mechanic and are within the scope of the present invention.

By considering the aforementioned description of the masking means and variable focal length means of the present invention, it should be apparent that activation of the switch 52 in a desired mode will simultaneously cause a change in the focal length of the lens 18 and of the size of the rectangle formed by the edges of the masking blades 108 and 110. By properly proportioning the gearing between these two assemblies, the change in the mask can correspond to the change in the portion of the image of the transparency projected by the lens 18 as it is varied in focal length (zoomed). Presently, when a zoom lens is employed on a projector, the projected image is increased in size, and if the screen is not large enough, it is projected off the end of the screen. By employing the mask of the present invention, as the image size is enlarged by the use of a zoom lens, it can be proportionately masked so that the enlarged image is cropped and therefore does not extend past the viewing surface. By varying the relationship between the rate of change of the focal length of the lens and the rate of change of the mask size, various other effects can be achieved as desired.

Although the mask and coupled zoom lens feature of the present invention does not have to be used in conjunction with the movable transparency feature thereof, a unique result accrues when these two apparatuses are used in combination. This is especially the case if the control function provided by the switch 52 is taken over by a microprocessor which also controls the function of controls 44 and 54 of control box 40 as illustrated in FIG. 1. As a result of such microprocessor control, a dramatic visual presentation can be made from a single transparency. The viewer can be given the feeling of pans and tilts, i.e., vertical and horizontal motion, of rotational motion, and also of moving toward and away from the subject matter of the transparency without the cost of more complicated techniques such as cinematography or transparency multi-imaging. In addition, the disjointed sensation of sequenced discrete transparencies is avoided. As a further accompaniment to the features of the present invention, suitable audio can be provided such as music, narration, or the like to provide a thoroughly engrossing presentation.

It will be understood that various changes in the details, materials, and arrangements of the parts and operational conditions which have been herein described and illustrated in order to explain the nature of the invention, may be made by those skilled in the art within the principles and scope of the invention.

Having thus set forth the nature of the invention, what is claimed is:

1. An apparatus for projecting a portion of a continuous integrated image transparency, randomly but deliberately selectable during projection comprising:
   illumination means for directing a beam of light along a preselected path;
   means for mounting said transparency so a portion thereof is disposed in said preselected path, said mounting means including a frame for fixedly and removably securing therein said transparency;
   optical means disposed along said preselected path and positioned so said transparency is disposed between said illumination means and said optical means, said optical means for projecting said portion of said image of said transparency disposed in said path on a viewing surface; and
   means for selectively continuously moving said mounting means and therefore said transparency in at least four directions within said preselected path during projection at a designated and controlled speed continuously adjustable within a range of speeds for continuously selecting and projecting various selected portions of said transparency on said viewing surface, movement of said transparency causing the projection on said viewing surface to present a continuous moving integrated image, said moving means being capable of moving said transparency randomly, said moving means including a carriage carrying said frame, said carriage for moving said frame independently in perpendicular directions in a single plane, said carriage including
   a substantially planar support having a projection aperture disposed therethrough,
   a first pair of rails movably mounted on said support, said frame being fixedly secured to said rails,
   a second pair of rails being fixedly secured to a supporting surface and movably secured to said support, said first pair of rails being substantially perpendicular to said second pair of rails,
   means for driving said first pair of rails simultaneously to effect movement of said frame relative to said support, and
   means for driving said support along said second pair of rails to effect movement of said frame relative to said second pair of rails, said frame moving in a single plane,
   driving of said first pair of rails and said frame thereby aligning different portions of said transparency with said projection aperture, said projections aperture being in the path of said light beam.

2. An apparatus in accordance with claim 1, wherein both said driving means comprise electrically operated motor drives.

3. An apparatus in accordance with claim 2, wherein said electrically operated motor drives are of the reversible variable speed type.

4. An apparatus in accordance with claim 2, wherein said electrically operated motor drives are activated and controlled according to a preselected plan by a microprocessor.

5. An apparatus in accordance with claim 1, wherein said frame comprises a plate having a window disposed therethrough and a carrier for mounting said transparency, said carrier being rotatably affixed to said plate with said transparency being disposed over said window in a plane substatntially parallel to the plane in which said plate is disposed.

6. An apparatus in accordance with claim 5, further comprising means for rotating said carrier relative to said plate.

7. An apparatus in accordance with claim 6, wherein said rotating means comprises an electrical drive motor which engages said carrier to effect the rotation thereof.

8. An apparatus in accordance with claim 1, wherein said optical means comprises variable focal length optical means, said apparatus further comprising:
- variable masking means for masking varying sections of said transparency adjacent to the edges thereof, said masking means thereby dictating the size of said selected portion of said transparency which is projected; and
- means for coupling said variable focal length optical means to said variable masking means wherein variations in said focal length of said optical means and variations in said masking means are synchronized in a preselected proportion.

9. An apparatus in accordance with claim 8, wherein said variable masking means comprises:
- a plate having a substantially rectangular window disposed therethrough;
- first and second substantially L-shaped masking blades disposed adjacent to said plate so as to form a rectangle adjacent to said rectangular window; and
- means for positioning said first and second substantially L-shaped masking blades to vary the size of the rectangle formed thereby, the movement of said masking blades thereby effectively varying the size of said rectangular window.

10. An apparatus in accordance with claim 9, wherein said positioning means comprises a pair of drive means, one of said drive means coupled to said first masking blade adjacent to the vertex thereof, the other of said drive means coupled to said second masking blade adjacent to the vertex thereof, said pair of drive means simultaneously moving said blades and said vertexes thereof toward or away from each other along a preselected diagonal line which runs through said vertexes.

11. An apparatus in accordance with claim 10, wherein one of said drive means comprises a linear cam which is driven by an electric motor.

12. An apparatus in accordance with claim 11, wherein said variable focal length optical means comprises a movable optical segment, the movement of said movable optical segment varying the focal length of said optical means.

13. An apparatus in accordance with claim 12, further comprising means for moving said optical segment, said means for moving said optical segment being coupled to one of said drive means so that the activation thereof simultaneously moves said optical segment.

14. A visual presentation projection apparatus comprising in combination:
- a continuous integrated image transparency;
- means for mounting said transparency, said mounting means including a frame for fixedly and removably securing therein said transparency;
- illumination means for directing a beam of light through a selected portion of said transparency;
- optical means for projecting the portion of the image on said portion of said transparency onto a selected viewing surface, said beam of light passing through said optical means after said transparency; and
- means for selectively continuously moving said mounting means and therefore said transparency in at least four directions during projection at a designated and controlled speed continuously adjustable within a range of speeds for selecting said portion of said transparency through which said beam of light will pass and therefore said portion of said image projected by said optical means, movement of said transparency causing the projection on said viewing surface to present a continuous moving integrated image, said moving means including a carriage carrying said frame, said carriage for moving said frame independently in perpendicular directions in a single plane, said carriage including
- a substantially planar support having a projection aperture disposed therethrough,
- a first pair of rails movably mounted on said support, said frame being fixedly secured to said rails,
- a second pair of rails being fixedly secured to a supporting surface and movably secured to said support, said first pair of rails being substantially perpendicular to said second pair of rails,
- means for driving said first pair of rails simultaneously to effect movement of said frame relative to said support, and
- means for driving said support along said second pair of rails to effect movement of said frame relative to said second pair of rails, said frame moving in a single plane,
- driving of said first pair of rails and said frame thereby aligning different portions of said transparency with said projection aperture, said projections aperture being in the path of said light beam.

15. A visual presentation projection apparatus in accordance with claim 14, wherein both said driving means comprise electrically operated motor drives.

16. A visual presentation projection apparatus in accordance with claim 15, wherein said electrically operated motor drives are of the reversible variable speed type.

17. A visual presentation projection apparatus in accordance with claim 15, wherein said electrically operated motor drives are activated and controlled according to a preselected plan by a microprocessor.

18. A visual presentation projection apparatus in accordance with claim 14, wherein said frame comprises a plate having a window disposed therethrough and a carrier for mounting said transparency, said carrier being rotatably affixed to said plate with said transparency being disposed over said window in a plane substantially parallel to the plane in which said plate is disposed.

19. A visual presentation projection apparatus in accordance with claim 18, further comprising means for rotating said carrier relative to said plate.

20. A visual presentation projection apparatus in accordance with claim 19, wherein said rotating means comprises an electric drive motor which engages said carrier to effect the rotation thereof.

21. A visual presentation projection apparatus in accordance with claim 14, wherein said optical means comprises variable focal length optical means, said apparatus further comprising:
  variable masking means for masking varying sections of said transparency adjacent to the edges thereof, said masking means thereby dictating the size of said selected portion of said transparency which is projected; and
  means for coupling said variable focal length optical means to said variable masking means wherein variations in said focal length of said optical means and variations in said masking means are synchronized in a preselected proportion.

22. A visual presentation projection apparatus in accordance with claim 21, wherein said variable masking means comprises:
  a plate having a substantially rectangular window disposed therethrough;
  first and second substantially L-shaped masking blades disposed adjacent to said plate so as to form a rectangle adjacent to said rectangular window; and
  means for positioning said first and second substantially L-shaped masking blades to vary the size of the rectangle formed thereby, the movement of said masking blades thereby effectively varying the size of said rectangular window.

23. A visual presentation projection apparatus in accordance with claim 22, wherein said positioning means comprises a pair of drive means, one of said drive means coupled to said first masking blade adjacent to the vertex thereof, the other of said drive means being coupled to said second masking blade adjacent to the vertex thereof, said pair of drive means simultaneously moving said blades and said vertexes thereof toward or away from each other along a preselected diagonal line which runs through said vertexes.

24. A visual presentation projection apparatus in accordance with claim 23, wherein one of said drive means comprises a linear cam which is driven by an electric motor.

25. A visual presentation projection apparatus in accordance with claim 24, wherein said variable focal length optical means comprises a movable optical segment, the movement of said movable optical segment varying the focal length of said optical means.

26. A visual presentation projection apparatus in accordance with claim 25, further comprising means for moving said optical segment, said means for moving said optical segment being coupled to one of said drive means so that the activation thereof simultaneously moves said optical segment.

27. An apparatus for projecting the image of a transparency onto a viewing surface comprising:
  illumination means for directing a beam of light through said transparency;
  variable focal length optical means for projecting said image of said transparency onto said viewing surface, said beam of light passing through said optical means after said transparency;
  variable masking means for masking varying sections of said transparency adjacent to the edges thereof, said masking means thereby dictating the size of the portion of said transparency which is projected, said variable masking means comprising a plate having a substantially rectangular window disposed therethrough, first and second substantially L-shaped masking blades disposed adjacent to said plate so as to form a rectangle adjacent to said rectangular window, and means for positioning said first and second substantially L-shaped masking blades to vary the size of the rectangle formed thereby, movement of said masking blades thereby effectively varying the size of said rectangular window, said positioning means including a pair of drive means, one of said drive means coupled to said first masking blade adjacent to the vertex thereof, the other of said drive means being coupled to the second masking blade adjacent to the vertex thereof, said pair of drive means simultaneously moving said blades and said vertexes toward or away from each other along a preselected diagonal line which runs through said vertexes; and
  means for coupling said variable focal length optical means to said variable masking means wherein variations in said focal length of said optical means and variations in said masking means are synchronized in a preselected proportion.

28. An apparatus in accordance with claim 27, wherein one of said drive means comprises a linear cam which is driven by an electric motor.

29. An apparatus in accordance with claim 28, wherein said variable focal length optical means comprises a movable optical segment, the movement of said movable optical segment varying the focal length of said optical means.

30. An apparatus in accordance with claim 29, further comprising means for moving said optical segment, said means for moving said optical segment being coupled to one of said drive means so that the activation thereof simultaneously moves said optical segment.

31. An apparatus for projecting a portion of a continuous integrated image transparency, randomly but deliberately selectable during projection comprising:
  illumination means for directing a beam of light along a preselected path;
  means for mounting said transparency so a portion thereof is disposed in said preselected path;
  variable focal length optical means disposed along said preselected path and positioned so said transparency is disposed between said illumination means and said optical means, said optical means for projecting said portion of said image of said transparency disposed in said path on a viewing surface;
  variable masking means for masking varying sections of said transparency adjacent to the edges thereof, said masking means thereby dictating the size of said selected portion of said transparency which is projected, said variable masking means including a plate having a substantially rectangular window disposed therethrough, said variable masking means including first and second substantially L-shaped masking blades disposed adjacent to said plate so as to form a rectangle adjacent to said rectangular window, said variable mask means including means for positioning said first and second substantially L-shaped masking blades to vary the size of the rectangle formed thereby, the movement of said masking blades thereby effectively varying the size of said rectangular window, said positioning means including a pair of drive means, one of said drive means coupled to said first masking blade adjacent to the vertex thereof, the other of said drive means coupled to said second masking blade adjacent to the vertex thereof, said pair of drive means simultaneously moving said blades and said vertexes thereof toward or away from each other along a preselected diagonal line which runs through said vertexes;

means for coupling said variable focal length optical means to said variable masking means wherein variations in said focal length of said optical means and variations in said masking means are synchronized in a preselected proportion; and means for selectively continuously moving said mounting means and therefore said transparency in at least four directions within said preselected path during projection at a designated and controlled speed continuously adjustable within a range of speeds for continuously selecting and projecting various selected portions of said transparency on said viewing surface, movement of said transparency causing the projection on said viewing surface to present a continuous moving integrated image, said moving means being capable of moving said transparency randomly.

32. An apparatus in accordance with claim 31, wherein one of said drive means comprises a linear cam which is driven by an electric motor.

33. An apparatus in accordance with claim 32, wherein said variable focal length optical means comprises a movable optical segment, the movement of said movable optical segment varying the focal length of said optical means.

34. An apparatus in accordance with claim 33, further comprising means for moving said optical segment, said means for moving said optical segment being coupled to one of said drive means so that the activation thereof simultaneously moves said optical segment.

35. A visual presentation projection apparatus comprising in combination:

a continuous integrated image transparency;

means for mounting said transparency;

illumination means for directing a beam of light through a selected portion of said transparency;

variable focal length optical means for projecting the portion of the image on said portion of said transparency onto a selected viewing surface, said beam of light passing through said optical means after said transparency;

variable masking means for masking varying sections of said transparency adjacent to the edges thereof, said masking means thereby dictating the size of said selected portion of said transparency which is projected, said variable masking means including a plate having a substantially rectangular window disposed therethrough, said variable masking means including first and second substantially L-shaped masking blades disposed adjacent to said plate so as to form a rectangle adjacent to said rectangular window, and said variable masking means including means for positioning said first and second substantially L-shaped masking blades to vary the size of the rectangle formed thereby, the movement of said masking blades thereby effectively varying the size of said rectangular window, said positioning means including a pair of drive means, one of said drive means coupled to said first masking blade adjacent to the vertex thereof, the other of said drive means being coupled to said second masking blade adjacent to the vertex thereof, said pair of drive means simultaneously moving said blades and said vertexes thereof toward or away from each other along a preselected diagonal line which runs through said vertexes;

means for coupling said variable focal length optical means to said variable masking means wherein variations in said focal length of said optical means and variations in said masking means are synchronized in a preselected proportion; and means for selectively continuously moving said mounting means and therefore said transparency in at least four directions during projection at a designated and controlled speed continuously adjustable within a range of speeds for selecting said portion of said transparency through which said beam of light will pass and therefore said portion of said image projected by said optical means, movement of said transparency causing the projection on said viewing surface to present a continuous moving integrated image.

36. A visual presentation projection apparatus in accordance with claim 35, wherein one of said drive means comprises a linear cam which is driven by an electric motor.

37. A visual presentation projection apparatus in accordance with claim 36, wherein said variable focal length optical means comprises a movable optical segment, the movement of said movable optical segment varying the focal length of said optical means.

38. A visual presentation projection apparatus in accordance with claim 37, further comprising means for moving said optical segment, said means for moving said optical segment being coupled to one of said drive means so that the activation thereof simultaneously moves said optical segment.

* * * * *

UNITED STATES PATENT AND TRADEMARK OFFICE
CERTIFICATE OF CORRECTION

PATENT NO. : 4,609,268
DATED : Sep. 2, 1986
INVENTOR(S) : Cliff Crawford

It is certified that error appears in the above-identified patent and that said Letters Patent is hereby corrected as shown below:

In the Specification

Column 10, line 20; delete "20" and insert therefor --120--.

Column 10, line 23; delete "24" and insert therefor --124--.

Signed and Sealed this

Seventeenth Day of February, 1987

Attest:

DONALD J. QUIGG

*Attesting Officer*  *Commissioner of Patents and Trademarks*